United States Patent

Kendrick

[15] 3,641,819
[45] Feb. 15, 1972

[54] FLOW-RESPONSIVE CIRCUIT

[72] Inventor: Gary R. Kendrick, Tulsa, Okla.

[73] Assignee: Combustion Engineering, Inc., New York, N.Y.

[22] Filed: Dec. 18, 1967

[21] Appl. No.: 691,527

[52] U.S. Cl. ................................................73/229, 340/239
[51] Int. Cl. ...........................................................G01f 1/00
[58] Field of Search ......................73/229, 231, 199; 340/239

[56] References Cited

UNITED STATES PATENTS

| | | | |
|---|---|---|---|
| 3,068,694 | 12/1962 | Worswick | 73/194 |
| 3,007,414 | 11/1961 | Long et al. | 340/239 X |
| 3,075,383 | 1/1963 | Favill et al. | 73/231 |
| 3,175,152 | 3/1965 | Shafer | 73/231 X |
| 3,430,489 | 3/1969 | Pfrehm | 73/231 |

Primary Examiner—Charles A. Ruehl
Attorney—Arthur L. Wade

[57] ABSTRACT

A circuit receives pulses of voltage from a fluid meter. A section of the circuit converts the pulses to a DC potential. The DC potential is connected to a transistor through a selection switch to control a relay actuation when the DC potential value changes from a preselected range of values. A time-delay section in the circuit provides a time period between the potential value change and relay actuation.

2 Claims, 1 Drawing Figure

PATENTED FEB 15 1972
3,641,819
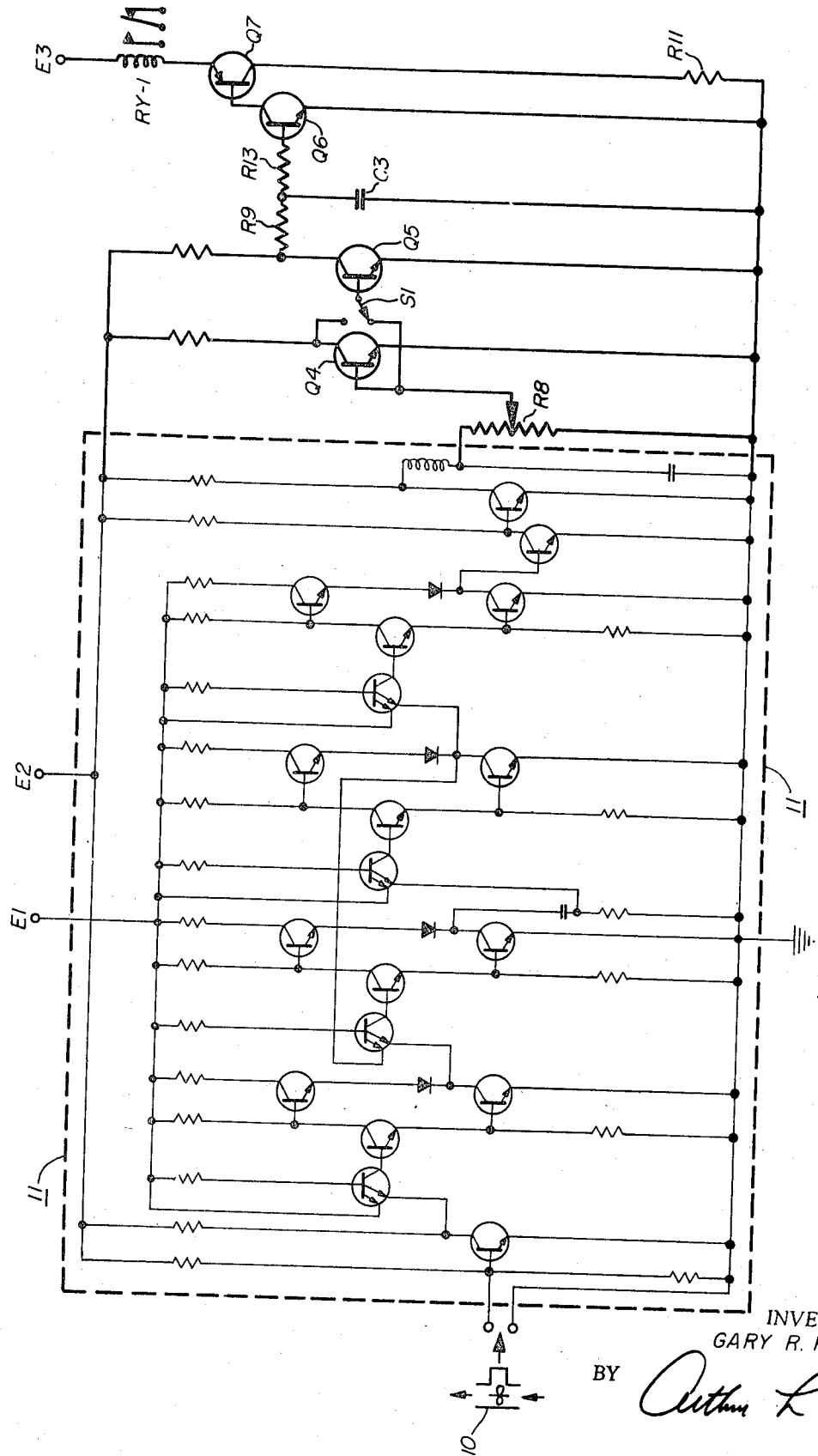
INVENTOR.
GARY R. KENDRICK
BY Arthur L. Wade
ATTORNEY 3,641,819

FLOW-RESPONSIVE CIRCUIT

BACKGROUND OF THE INVENTION

1. Field of the Invention

The present invention relates to devices for manifesting the flow of fluids through a conduit. More particularly, the invention relates to a circuit responsive to the flow of fluids by providing a manifestation when the flow exceeds a predetermined range for a predetermined period of time or when the flow decreases below a predetermined range for a predetermined period of time.

2. Description of the Prior Art

There have been numerous attempts to monitor fluid flow satisfactorily when the flow is irregular, both in rate and in direction within a range of rates. The problem is very critical in the oil producing industry because of the value of establishing the producing capabilities of oil wells which are notorious for their irregular flow.

Complex producing programs depend upon fresh, reliable data on the producing characteristics of pumped wells. Delivery must be predictable and the maintenance schedule must be planned for an individual well. An individual well within a group can be periodically shut down for workover, but the period must be planned for the overall efficient function of the group of wells.

Many devices have been designed for oil wells to include an element responsive to the flow of fluids from a well. The element has been linked to a relay to actuate it when the flow ceases. However, all of the prior art devices I have knowledge of are relatively crude and inflexible. These prior art devices are generally arranged to simply manifest when a flow stops and when it begins again. There is need for a device to manifest a flow rate above a normal range and below a normal range, with a time delay.

SUMMARY OF THE INVENTION

It is a principle object of the present invention to manifest when a fluid flow rate has increased, or decreased, from a predetermined range of rates.

Another object is to provide a predetermined delay in the manifestation after the flow rate has moved from the predetermined range.

The invention contemplates an electric circuit receiving voltage pulses from a flow meter element as representative of flow rate and converting the pulses into a DC potential. A portion of the circuit provides selection of a range of the flow potential and connects the potential to a transistor network which provides a time delay in utilizing the potential to actuate a relay for the manifestation.

The invention contemplates connecting the DC voltage to the transistor circuit through a switch which provides the relay actuation signal when the flow potential exceeds a predetermined range, or, alternately, when the flow potential falls below a predetermined range.

The invention contemplates the transistor circuit receiving the DC flow potential and having a capacitor-resistance network which is charged to actuate a relay. When the predetermined value of the received potential is reached, the potential of the charged capacitor decreases to a predetermined value at a predetermined rate. The relay is then actuated at the decreased value.

Other objects, advantages and features of this invention will become apparent to one skilled in the art upon consideration of the written specification, appended claims, and attached drawing, wherein;

The drawing is a schematic representation of an electric circuit in which the present invention is embodied.

DESCRIPTION OF THE PREFERRED EMBODIMENT

The drawing is a schematic illustration of the components, and their connections, of an electric circuit in which the invention is embodied. Only the most perfunctory of representations are needed in a disclosure of this type to adequately teach the invention.

A primary element is arranged to contact a flowing fluid and generate voltage pulses at a frequency proportional to the rate of flow. The drawing represents a turbine meter 10 as such element. The function of the pickup of a turbine meter is too well known in the art to require detailed discussion.

Additionally, the portion of the electric circuit immediately connected to the turbine meter can be disposed of almost summarily. Each component of circuit portion 11 is depicted, but there is no need to carefully delineate how the sinusoidal form of voltage output of meter 10 is shaped into a square form, amplified, inverted and filtered into a DC voltage applied to potentiometer R8. This function of circuit portion 11 is readily understood by one skilled in this art through a relatively cursory inspection of the illustration of the drawing.

POTENTIOMETER R8

Potentiometer R8 is energized by the output of turbine meter 10. By adjustment of this variable resistance, a predetermined portion of the flow-potential can be selected as an output. This potential is utilized to actuate relay Ry-1 and thereby manifest a selected condition of the flow rate of fluid passing through turbine meter 10. Potentiometer R8 is, therefore, the means whereby a selection is made of the range of flow potential which will keep relay Ry-1 in one of its two states.

TRANSISTOR Q5

The flow-potential range, predetermined by the setting of R8, is connected to the base of transistor Q5. This connection is made alternately through a second transistor Q4. Switch S1 is the means whereby these connections are alternatively completed.

Broadly, Q5 is connected to transistors Q6 and Q7 whose conductivity, and nonconductivity, determine into which of two states, conditions or positions relay Ry-1 is placed. Transistor Q5 controls the conductivity, and nonconductivity, of transistors Q6 and Q7, modified by a time delay section of the circuit.

When Q5 is turned off, or rendered nonconductive, transistors Q6 and Q7 are turned on, or rendered conductive. As Q6 and Q7 are in series with power source E3 and relay Ry-1, the relay will be energized from source E3 when the transistors are conductive. Correspondingly, when Q5 is turned on, made conductive, relay Ry-1 is deenergized. Therefore, the basic function of the circuit is determined by this control of transistor Q5. To be very specific, control of Q5 means rendering it conductive or nonconductive. Generally, this control is exerted by applying a voltage to the base of the transistor; a voltage which determines whether the transistor conducts, or does not conduct.

DIRECT CONNECTION BETWEEN R8 AND Q5

The circuit id depicted with potentiometer R8 connected directly to the base of Q5. R8 is adjusted so that a proportional range of the R8 potential will be applied to the base. This potential range is selected so it will not reach the "break-over" potential of Q5. The "break-over" potential is that value at which Q5 will become conductive. This range is regarded as "normal" in that the flow rates through the turbine meter which generate the range are to be expected for continuous operation of the source of the fluid flowing through the turbine meter. When the flow rate exceeds the normal range, the break-over potential is reached and Q5 becomes conductive.

CONNECTION OF R8 AND Q5 THROUGH Q4

Switch S1 is moved to its position alternate to that shown in the drawing. R8 is adjusted to select a range of potential proportional to the lowest range of flows expected through the turbine meter. The potentials of this range are applied to the base of transistor Q4 and are all great enough to maintain Q4 conductive.

However, the collector of Q4 is now connected to the base of Q5 through switch S1. Therefore, the range of potential applied to Q5 is below the break-over value and Q5 remains nonconductive for this now "normal" range of flow. When the flow rate through the turbine meter decreases to a value below the new normal range, the critical break-over value is reached. Q4 becomes nonconductive since potential at $R_8$ and thus the voltage of $Q_4$ drop and the potential on the base of Q5 becomes positive and reaches its critical value and Q5 becomes conductive.

In summation, switch S1 selectively provides either of two potential ranges from R8 which can be described as "high normal" and "low normal." If the actual potential of R8 moves out of the normal ranges of potential selected for R8, the critical potential of the base of Q5 is reached and Q5 becomes conductive. The subsequent, following portions of the circuit respond to the conductivity, and nonconductivity of Q5 by triggering Ry-1 between its two states, positions or conditions for the desired manifestation of the flow rate of fluids through the turbine meter. It should be apparent that the switch S1 may be manually operated at periodic intervals to check that the flow has not moved out of the normal flow range in one direction such as too low when the relay circuit does not indicate or manifest a too high condition and vice versa. Alternatively, the switch means S1 could be of an automatic, cyclic or periodic operating form so as to eliminate the need for an operator to be present at the switch site. Another obvious choice would be to utilize two such relay driving circuits as described, with one set for "high normal" operation and the other switched to "low normal" operation. In this array, the switch means 51 could be eliminated to reduce the circuit costs.

TIME DELAY

Up to this point, the actuation of relay Ry-1 has been described as dependent upon the control of Q5. The conductivity of Q5 has been controlled relative to selected normal ranges of the R8 potential. However, this signal from Q5 is modified with a time delay feature in this embodiment of the invention.

Fundamentally, a charged capacitor C3 is discharged to establish the time span desired before the signal of Q5 is effective to actuate relay Ry-1. C3 is connected to the collector of Q5 and ground. When Q5 is nonconductive, C3 charges to the potential of source E2. When Q5 becomes conductive, C3 discharges its potential.

Resistance R9 is placed in series between the Q5 collector and C3. The value of R9 is included in the means for predetermining the time required to equalize the potential across C3. This discharge path of R9 and Q5 is a significant factor in predetermining the delay between Q5 becoming conductive and C3 being discharged.

C3 has a parallel discharge path including R13 and the base-emitter circuit of Q6. Normally the potential sustained on C3 is applied to the base of Q6 to maintain Q6 conductive. Collapse of the C3 potential triggers Q6 into nonconductivity. This parallel path of discharge therefore transmits the "signal" of Q5 to the transistors Q6 and Q7 which directly control the application of power to relay Ry-1 and the removal of power from relay Ry-1.

CIRCUIT OF RELAY Ry-1

Relay Ry-1 is disclosed as comprising a simple coil to generate an electric-magnetic field to actuate a two-position switch. A source E3 is provided for the relay circuit which is expected to be significantly higher than E2. This source E3 is connected in series with the coil of Ry-1, transistor Q7 and a resistance R11. When Q7 is conductive, current flows in the relay coil to energize the relay and hold the two-position switch in one of its positions. When Q7 is nonconductive, the relay is deenergized.

Q7 is controlled by Q6. The conductivity of Q6 results in the conductivity of Q7. When Q6 becomes nonconductive at the end of the time delay period, it carries Q7 into nonconductivity very quickly.

Q7 is in a "power" circuit which is energized by a source E3 which is relatively high in comparison with the "signal" circuit of Q6. The larger changes of potential required for actuation of the power circuit are not compatible with the lower changes of the signal circuit; otherwise, Q7 could be substituted for Q6. The practical arrangement is for Q6 to control Q7 and regulate the power circuit by Q6.

CONCLUSION

The operation of the complete system should now be obvious from the detailed description of operation given for its various sections. The pulses of voltage generated by the turbine meter are converted to a DC voltage. A portion of this voltage is selected to control transistor Q5 which, in turn, controls the relay circuit. If the DC voltage moves away from the predetermined, selected normal range setting, the relay is actuated after a predetermined time delay.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A system to monitor and control fluid flow rates through a flow meter, including,
    an element in contact with the fluid flow to produce voltage pulses directly proportional to the flow rate,
    circuit means connected to said element to convert the voltage pulses to a DC voltage signal analogous to the voltage pulses,
    a potentiometer having an adjustable voltage tap, said potentiometer being connected to said circuit means to divide the DC voltage and select predetermined portions thereof for utilization in the system,
    a two-way switch means having first and second selectively operative positions, a first transistor having its base connected through said switch to said voltage tap when the first operative position of the switch has been selected
    a second transistor connected to said voltage tap by its base and having its collector connected through said switch to the base of said first transistor when the second operative position of the switch has been selected,
    a resistor-capacitor circuit connected to a first source of power for charging the capacitance when the first transistor is only partially conductive and having a discharge path including the first transistor to discharge the capacitor at a predetermined rate when the first transistor is rendered fully conductive, the conductivity level of said first transistor being responsive to the magnitude of said DC voltage, the adjusted position of said voltage tap, and the selected position of said switch means,
    and a relay circuit connected to the capacitor and a second source of power and arranged to be deenergized a predetermined time after the capacitor discharge is initiated.

2. The system of claim 1 wherein,
    the potentiometer comprises a variable resistance,
    and the resistor of the resistor-capacitor is sized to exhibit a predetermined rate of discharge.

\* \* \* \* \*